T. A. McCARTY.
COMBINATION HANDLE FOR ROLLING PINS AND OTHER IMPLEMENTS.
APPLICATION FILED FEB. 25, 1918.
1,267,327.
Patented May 21, 1918.
2 SHEETS—SHEET 1.
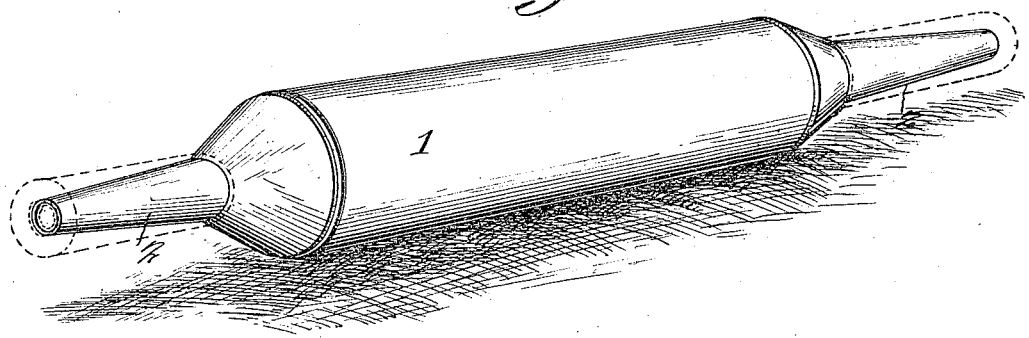
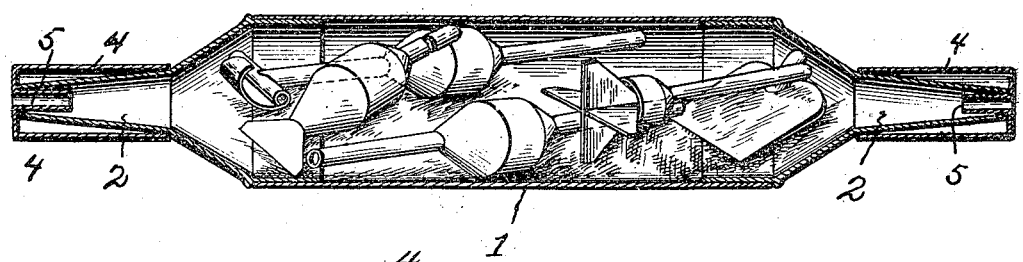
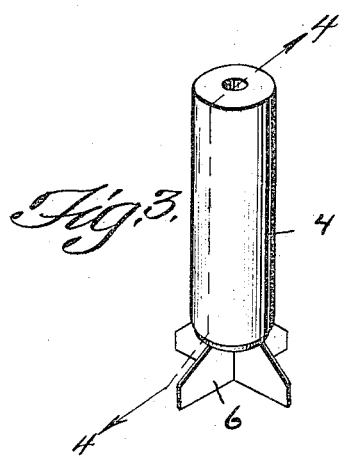
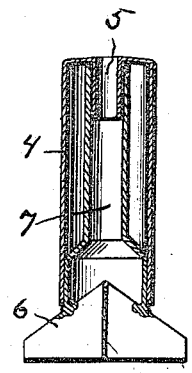
Witnesses
Inventor
T. A. McCarty
By
Attorneys T. A. McCARTY.
COMBINATION HANDLE FOR ROLLING PINS AND OTHER IMPLEMENTS.
APPLICATION FILED FEB. 25, 1918.
1,267,327.
Patented May 21, 1918.
2 SHEETS—SHEET 2.
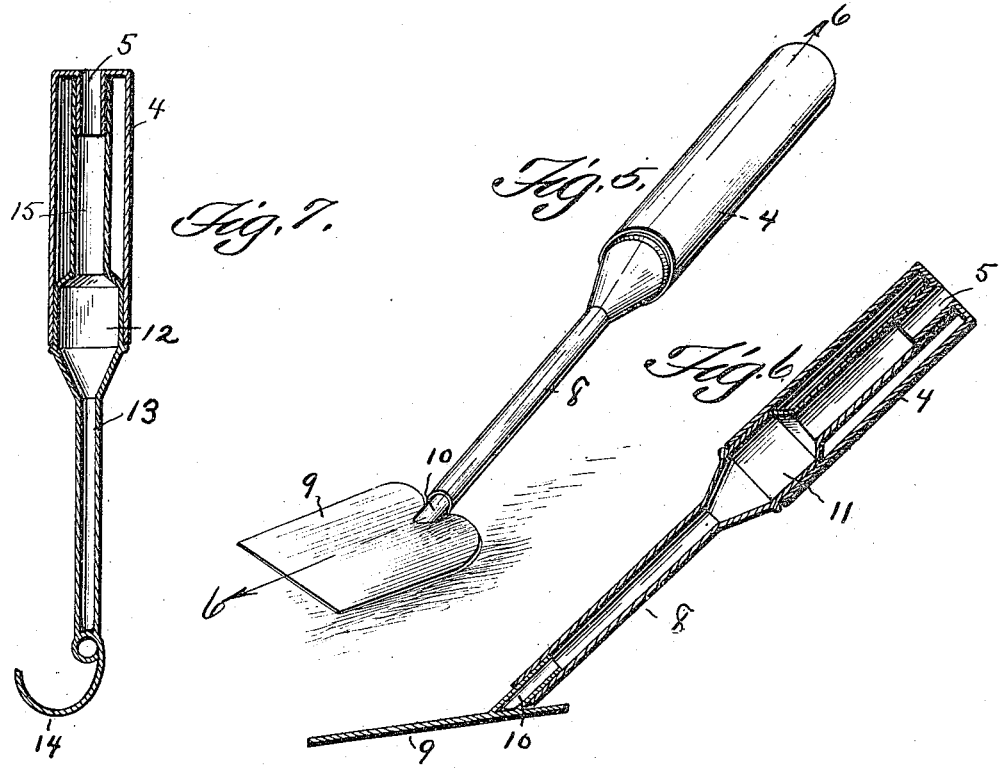
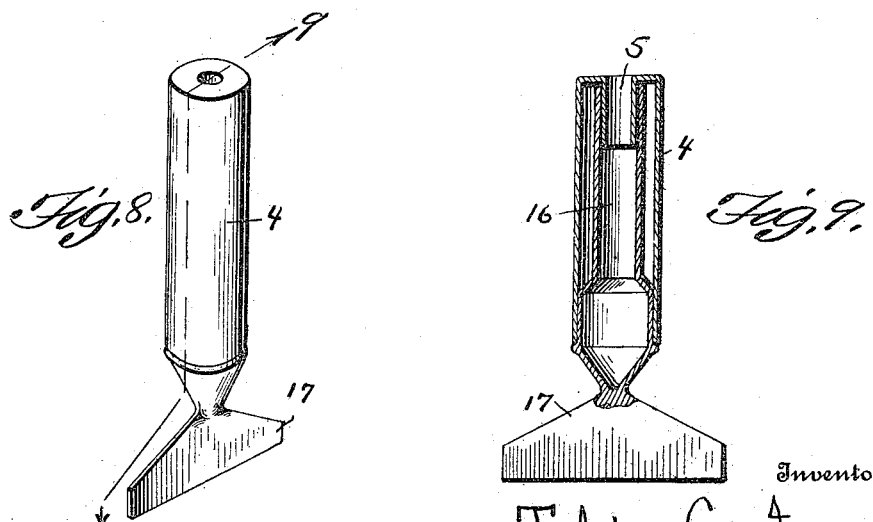

UNITED STATES PATENT OFFICE.

THOMAS A. McCARTY, OF WASHINGTON, DISTRICT OF COLUMBIA, ASSIGNOR OF ONE-HALF TO HOSEA CASHWELL, OF MOLTONVILLE, NORTH CAROLINA.

COMBINATION-HANDLE FOR ROLLING-PINS AND OTHER IMPLEMENTS.

1,267,327.

Specification of Letters Patent. Patented May 21, 1918.

Application filed February 25, 1918. Serial No. 219,051.

*To all whom it may concern:*

Be it known that THOMAS A. McCARTY, a citizen of the United States, residing at Congress Heights, in the city of Washington and District of Columbia, has invented certain new and useful Improvements in Combination-Handles for Rolling-Pins and other Implements; and he does hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in combination rolling pins, kitchen utensils, etc., and consists of a simple and efficient kit in which the handle may be applied to various devices.

The invention comprises a simple and efficient device of this nature having further details of construction, combinations and arrangements of parts which will be hereinafter fully described, shown in the accompanying drawings and then specifically defined in the appended claims.

My invention is illustrated in the accompanying drawings which, with the figures of reference marked thereon, form a part of this specification and in which:

Figure 1 is a perspective view showing the application of my invention to a rolling pin.

Fig. 2 is a central longitudinal sectional view through the pin.

Fig. 3 is a detail perspective showing the application of the invention to a chopping knife.

Fig. 4 is a sectional view on line 4—4 of Fig. 3.

Fig. 5 is a detailed perspective showing the application of my invention to a shovel.

Fig. 6 is a sectional view on line 6—6 of Fig. 5.

Fig. 7 is a sectional view showing a modification of the invention as applied to a hook.

Fig. 8 is a detailed perspective showing the invention as applied to a scraper, and Fig. 9 is a sectional view on line 9—9 of Fig. 8.

Reference now being had to the details of the drawings by numerals:

1 designates a rolling pin having spindle ends 2, said rolling pin being adapted to contain the other articles in connection with which the invention is to be applied. Handles 3 are of cylindrical form and the outer end 4 is closed and provided with an open-ended tubular projection 5 over which the spindle ends of the rolling pin telescopes and have bearing thereon. In this form of the application of my invention it will be noted that the handles have swivel connection with the spindle ends of the rolling pin.

In Fig. 3 of the drawings I have shown a modification of my invention and in which the invention is applied to a meat chopper designated by numeral 6 and which has a tubular shank portion 7 which telescopes over the tubular shell 5 of the handle 4, thus securely holding the handle in place. In Fig. 5 of the drawings the handle 4 is shown as applied to the shank portion 8 of a shovel 9 having a cylindrical stub shank portion telescoping within the part 8 and which part has an enlarged cylindrical portion 11 intermediate its ends and over which the handle telescopes, while the extreme upper end of the portion 8 telescopes over the tubular portion 5.

In Fig. 7 of the drawings the handle 4 is shown as fitting over the cylindrical part 12 of the shank portion 13 having a hook 14 at one end, while a cylindrical portion 15 of the shank 13 telescopes over the tubular part 5.

In Figs. 8 and 9 of the drawings the handle 4 is shown fitted over the cylindrical shank portion 16 of the scraper 17.

By the provision of the apparatus embodying the features of my invention, it will be noted that a simple and efficient kit of culinary articles is provided which when not in use may be contained within the rolling pin, and when desired for use separately the handles of the rolling pin may be fitted to each and every one of the devices for use as may be desired.

What I claim to be new is:

1. In combination with a culinary article having a hollow tubular end with a tapering portion, a cylindrical handle open at one end and its other end closed, and provided with a central open ended inwardly extending tubular portion adapted to telescope within the tubular end of the culinary article, the open end of the handle fitted over the tapering portion of said tubular end of the article.

2. A rolling pin having contracted tapering spindle ends, hollow cylindrical handles fitted over said spindle ends and each having a central inwardly extending tubular portion telescoping within the end of a spindle portion and upon which the latter has a bearing.

3. A rolling pin having hollow tapering spindle ends, hollow cylindrical handles each having its outer end closed and its inner end open and fitted over the spindle ends, each handle having an inwardly projecting contracted cylindrical portion telescoping within the spindle end, and having a rotatable bearing therein.

In testimony whereof I hereunto affix my signature in presence of two witnesses.

THOMAS A. McCARTY.

Witnesses:
A. L. Hough,
Frank N. Hough.

Copies of this patent may be obtained for five cents each, by addressing the "Commissioner of Patents, Washington, D. C."